(12) United States Patent
Yamada

(10) Patent No.: US 7,883,596 B2
(45) Date of Patent: Feb. 8, 2011

(54) PROCESS AND SYSTEM FOR MAKING NOISE ABSORBER CARPET AND A NOISE ABSORBER CARPET MADE THEREFROM

(75) Inventor: Kohei Yamada, Hashima-gun (JP)

(73) Assignees: Kabushiki Kaisha Daiwa, Gifu-ken (JP); Kabushiki Kaisha Yachiyo, Gifu-ken (JP)

( * ) Notice: Subject to any disclaimer, the term of this patent is extended or adjusted under 35 U.S.C. 154(b) by 0 days.

(21) Appl. No.: 12/109,570

(22) Filed: Apr. 25, 2008

(65) Prior Publication Data

US 2008/0283183 A1    Nov. 20, 2008

Related U.S. Application Data

(63) Continuation-in-part of application No. 10/820,589, filed on Apr. 8, 2004, now abandoned.

(30) Foreign Application Priority Data

Apr. 11, 2003    (JP) .............................. 2003-107312

(51) Int. Cl.
*B32B 37/00* (2006.01)
(52) U.S. Cl. .................. 156/244.11; 156/252; 156/498; 156/499; 156/500; 156/513; 156/555; 156/582
(58) Field of Classification Search .................. 156/250, 156/252, 253, 311, 498, 510, 513, 555, 580, 156/582, 583.1, 242, 244.11, 499, 500, 501
See application file for complete search history.

(56) References Cited

U.S. PATENT DOCUMENTS

| 3,706,250 | A | 12/1972 | Herd |
| 4,112,161 | A | 9/1978 | Sorrells |
| 4,384,020 | A | 5/1983 | Beggs et al. |
| 4,511,424 | A | 4/1985 | Usui |
| 4,581,274 | A | 4/1986 | Johns et al. |
| 4,904,430 | A | 2/1990 | Yamada |
| 5,230,940 | A | 7/1993 | Bohm et al. |
| 2006/0246254 | A1 | 11/2006 | Yamada |

*Primary Examiner*—James Sells
(74) *Attorney, Agent, or Firm*—Adams Intellectual Property Law

(57) ABSTRACT

A noise absorber carpet comprised of a fabric layer portion and a resinous backing layer portion is provided. The fabric layer portion and the resinous backing layer portion are heat bonded with a press into the noise absorber carpet, and the press includes perforation pins and a cooling medium. The resinous backing layer portion is provided with noise absorbing perforations formed by contact with the perforation pins of the press and cooled by the cooling medium. The perforations having been cooled by the cooling medium with the press simultaneously with the bonding of the resinous backing layer portion with the fabric layer portion and the cooling of the press by the cooling medium, thereby providing for instant curing and fixation of the shape of the perforations.

11 Claims, 10 Drawing Sheets

PROCESS AND SYSTEM FOR MAKING NOISE ABSORBER CARPET AND A NOISE ABSORBER CARPET MADE THEREFROM

CROSS-REFERENCE TO RELATED APPLICATIONS

This application is a continuation in part of U.S. patent application Ser. No. 10/820,589 entitled "PROCESS AND SYSTEM FOR MAKING NOISE ABSORBER CARPET" filed on Apr. 8, 2004 now abandoned.

TECHNICAL FIELD AND BACKGROUND OF THE INVENTION

The present invention generally relates to a process and a system to make a noise absorber carpet, rug or mat (together hereinafter referred to as "carpet") generally used where noise damping or absorption is desired, including cars, buses, trains and airplanes as well as buildings and houses. More particularly, this invention relates to a process and a system to make a noise absorber carpet comprised of a fabric layer portion and a perforated backing layer portion.

A conventional noise damping or absorber car carpet is generally comprised of a piled fabric layer and a resilient plastic backing layer. The backing layer is generally formed of a synthetic resin material such as a vinyl chloride resin material. Such a car carpet may effectively block noises coming from below but will not effectively absorb noises coming from above, rather repelling the noises back into the car compartment. Many carpets also utilized a series of spikes on the underneath side for abrasion purposes. Typical carpets were constructed with the use of a heated press, however, the spikes lacked sufficient rigidity because the spikes were allowed to cool at too slowly of a rate and were left in a semi rigid state. This made it so that the spikes would not grasp underlying layers effectively.

Therefore a need remains to provide a carpet with perforation spikes of sufficient rigidity and having effective noise dampening characteristics.

SUMMARY OF THE INVENTION

Therefore, it is an object of the present invention to provide a process to make a noise absorber carpet comprised of a fabric layer portion and a perforated resinous backing layer portion at low costs.

It is another object of the present invention to provide a system to make a noise absorber carpet comprised of a fabric layer portion and a perforated resinous backing layer portion at low costs.

Other objects of the present invention will be known from the following description.

A process for making a spiked noise absorber carpet comprised of a fabric layer and a resinous backing layer includes feeding and rolling a softened resin material into a resinous sheet, providing spikes on the sheet, perforating the sheet, and heat bonding the spiked and perforated sheet on a fabric sheet material. The spikes are simultaneously cooled with a cooling medium to cure the spikes.

The above steps may be performed wholly or partially in a continuous manner to lower manufacturing costs.

Whole or part of the above steps may be performed while the resinous sheet remains substantially hot and soft such that no additional heating may be required so as to reduce manufacturing costs.

A process for making a spiked noise absorber carpet comprised of a fabric layer and two backing layers includes providing a base resinous backing sheet by feeding and rolling a softened resinous material into a sheet, spiking the sheet, feeding and laminating a softened upper resinous backing sheet on the base backing sheet, perforating the base and upperbacking sheets together, and heat bonding the upper backing sheet on a fabric sheet material. The process may skip provision of spikes for manufacturing a spikeless noise absorber carpet.

A system for making a spiked noise absorber carpet comprised of a fabric layer and a backing layer comprises a fabric feeder roll, a backing roll and a carpet draw roll. The feeder roll sends forward a continuous fabric sheet material onto the backing roll having spike depressions thereon. A softened resinous backing material is provided from a resin feeder onto the backing roll to form a continuous resin sheet on the backing roll, which is provided with spikes as pressed with a press roll against the backing roll. The spiked resinous sheet is also provided with perforations with a perforation roll having perforation pins, which presses the resinous sheet against the backing roll. The fabric sheet and the spiked and perforated backing sheet are heat bonded as they are pressed between the feeder roll and the backing roll. The backing layer is then cooled in order to instantaneously cure the perforations and spike depressions. The carpet draw roll draws the continuous spiked and perforated noise absorber carpet from the backing roll. The carpet draw roll may be eliminated. The backing roll may not have spike depressions to manufacture a spikeless noise absorber carpet.

The fabric sheet material on the fabric feeder roll may be preheated with a fabric heater to facilitate securer adhesion between the fabric sheet material and the spiked and perforated resinous backing sheet.

An additional resin feeder may be provided relative to the backing roll to form an additional backing layer or upper backing layer on the base backing layer. The base and the upper backing layers may be of an identical resinous material or different resinous materials. The dual backing layers are perforated together with the perforation roll, which are heat bonded onto the fabric sheet material to form a noise absorber carpet.

The fabric used to provide the fabric sheet material may be a nonwoven fabric, woven fabric, knitted fabric paper or any combination thereof. The fabric layer may be provided with pile to provide a cushioning effect and an improved appearance.

The fabric layer may comprise two sub-fabric layers (upper fabric layer and lower fabric layer), which may be of an identical fabric material or different fabric materials. These two sub-fabric layers may be bonded with a perforated adhesive sheet placed therebetween. The adhesive sheet may be a web-like sheet to be transformed into a perforated sheet by heat and pressure between the upper and the lower fabric layers.

The perforated adhesive sheet provides additional noise damping as the adhesive sheet, while letting portion of noises pass therethrough, vibrates to consume noise energy when it received noises coming through the upper fabric layer.

The resin material to form the upper backing layer and/or the resin material to form the base (lower) backing layer may be formed to provide continuous open cells so as to improve absorption of the noises passing through the continuous open cells. They also provide open pores on the perforation walls which additionally and effectively damp noises entering the perforations.

According to a preferred embodiment of the present invention, a process for making a noise absorber carpet is comprised of a fabric layer portion and a resinous backing layer portion. The process comprises the substantially concurrent steps perforating the resinous backing layer portion to form noise absorbing perforations therein by pressing a perforation roll having perforation pins against the resinous backing layer portion on the backing roll, press bonding the perforated resinous backing layer portion with a fabric layer portion, and cooling the backing roll at a temperature of about 10 to 50 degrees Celsius to cool and harden the perforations and fix the shape thereof.

According to another embodiment of the invention, the resinous backing layer portion comprises a plurality of backing layers.

According to another embodiment of the invention, slippage prevention spikes are provided on the backing layer portion by pressing the backing layer portion against a backing roll having slippage prevention depressions.

According to another embodiment of the invention, a system for making a noise absorber carpet is provided comprised of a fabric layer portion and a resinous backing layer portion, the system comprising a fabric feeder roll for feeding a continuous roll of fabric to a carpet take up roll, a backing roll downstream of the feeder roll for receiving a continuous sheet of soft resinous backing material and rotating the resinous backing material to the roll of fabric, at least one resin feeder for feeding the sheet of resinous backing material onto the backing roll, and a perforation roll having perforation pins for perforating the resinous backing material on the backing roll, wherein the backing roll is cooled at a temperature range of about 10 to 50 degrees Celsius.

According to another embodiment of the present invention, the at least one resin feeder comprises two resin feeders.

According to another embodiment of the present invention, the backing roll is provided with spike depressions thereon.

According to another embodiment of the present invention, the at least one resin feeder feeds a resinous backing material containing continuous open cells.

In yet another embodiment, a system for making a noise absorber carpet comprised of a fabric layer portion and a resinous backing layer portion, comprising a fabric feeder roll for feeding a continuous roll of fabric to a carpet take up roll, a backing roll having perforation pins, the backing roll arranged between the fabric feeder roll and the carpet take up roll for press bonding a perforated resinous backing material to the fabric, a least one resin feeder which feeds the resinous backing material in a sheet form onto the backing roll, and cooling means to cool the backing roll at a temperature range of about 10 to 50 degrees Celsius.

According to another embodiment, the cooling medium may be a fluid.

According to another embodiment, the cooling medium may be water.

DETAILED DESCRIPTION OF PREFERRED EMBODIMENTS AND BEST MODE

The process and the system of the present invention for making perforated noise absorber carpets are described hereunder in connection with the accompanying drawings.

Figure 1:
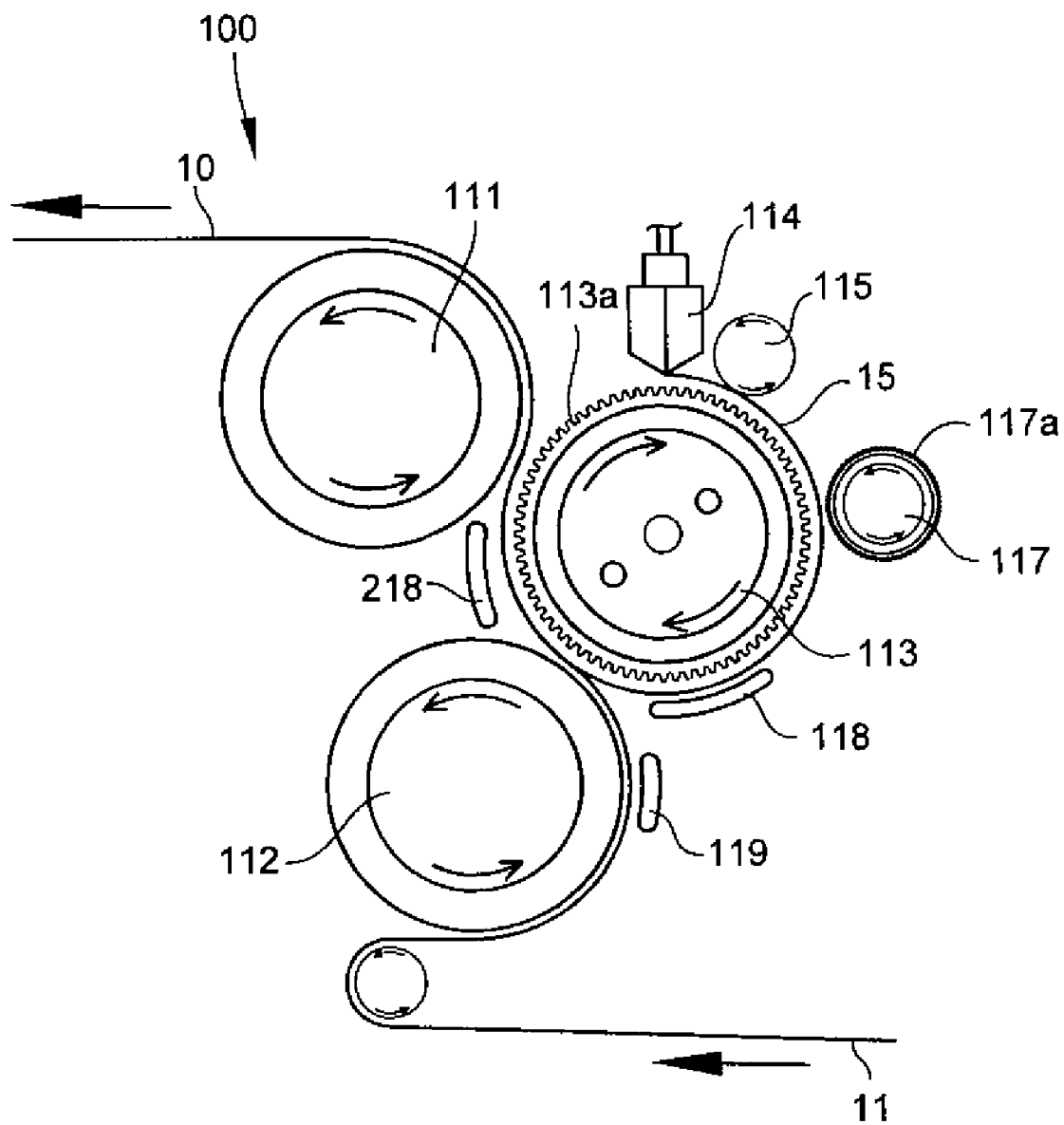
FIG. 1 shows a system for making a spiked noise absorber carpet comprised of a fabric layer and a perforated resinous backing layer according to an embodiment of the present invention.

A system for making a spiked noise absorber carpet comprised of a fabric layer and a resinous backing layer according to a preferred embodiment of the present invention is shown in FIG. 1.

The system 100 includes a fabric feeder roll 112 accompanied by a fabric heater 119, a backing roll 113 accompanied by a backing heater 118, a press roll 115, a perforation roll 117, a backing resin feeder 114, a carpet draw roll 111, and a cooling medium 218.

The backing resin feeder 114 feeds a softened resinous backing material 15 in a continuous sheet form onto the backing roll 113 rotating clockwise. The backing roll 113 is provided with spike depressions 132 thereon to form spikes 15a (FIG. 8) on the backing material 15 as the press roll 115 rotating counter-clockwise presses the backing material 15 against the backing roll 113. The backing roll 113 may be cooled by the cooling medium 218 in a range between 10 to 50° C. to assist formation of the spikes 15a. The perforation roll 117 is provided with perforation pins 117a thereon in order to perforate the backing material 15 as the perforation roll 117 rotating counter clockwise presses the backing material 15 against the backing roll 113.

The fabric used to provide the fabric sheet material 11 may be a nonwoven fabric, woven fabric, knitted fabric, paper or any combination thereof. The fabric layer may be provided with pile 12 (see FIG. 7) to provide a cushioning effect and an improved appearance.

The resinous backing material 15 may be a styrene-butadiene-styrene copolymer, acrylonitrile-butadiene copolymer, urethane resin, styrene-butadiene rubber, acrylonitrile-butadiene rubber, butadiene rubber, natural rubber, isoprene rubber or a combination thereof.

The backing material 15 may contain a conventional foaming agent to provide continuous open cells 15b (see FIG. 9) in the backing material 15 such as fatty acid soap, sodiumalkylaryl sulfonate, higher alcohol sodium sulfate, or N-octadecyl monoamide disodium sulfosuccinate in order to improve the noise absorption property of the noise absorber carpet. Noises hitting and/or passing through the continuous open cells 15b are effectively absorbed and damped. The resin feeder 114 and the press roll 115 should operate not to excessively crush the open cells 15b formed in the backing material 15.

The backing material 15 may also contain a conventional filler, extender, thickener and/or dispersant in order to improve the quality of the noise absorber carpet 10. The filler may be polyacrylic acid soda, carboxylmethylcellulose, aluminum hydroxide or antimony oxide. The thickener may be polyacrylic acid soda, carboxymethylcellulose, polyvinyl alcohol, casein or fermented polysacoharides. Low molecule polyacrylic acid soda is preferred. The dispersant may be tripolyphosphoric soda or hexametaphosphoric acid soda.

The fabric feeder roll 112 rotating counter-clockwise feeds a continuous fabric sheet material 11 onto the backing roll 113. The fabric sheet material 11 is heated with the fabric heater 119 to improve adhesion thereof with the spiked and perforated backing material 15 which is heated with the backing heater 118. The heated fabric sheet material 11 and the heated backing material 15 having perforations 16 (FIG. 9) are pressed toward each other between the fabric feeder roll 112 and the backing roll 113 such that they are securely bonded to form a continuous noise absorber carpet 10. The carpet is then cooled by a cooling medium 218 in a range between 10 and 50° C. to instantaneously cure the perforations and spikes. The carpet draw roll 111 rotating counter clockwise draws the noise absorber carpet 10 from the backing roll 113. An ultrasonic generator may be connected with the press to provide ultrasonic vibrations.

In an embodiment of the present invention, the backing heater 118 heats the backing material 15 in the range of 70 to 210° C. In another embodiment, the backing material 15 is heated in the range of 70 to 150° C.

For making a spikeless noise absorber carpet, no spike depressions 113a are provided on the backing roll 113.

Figure 2:
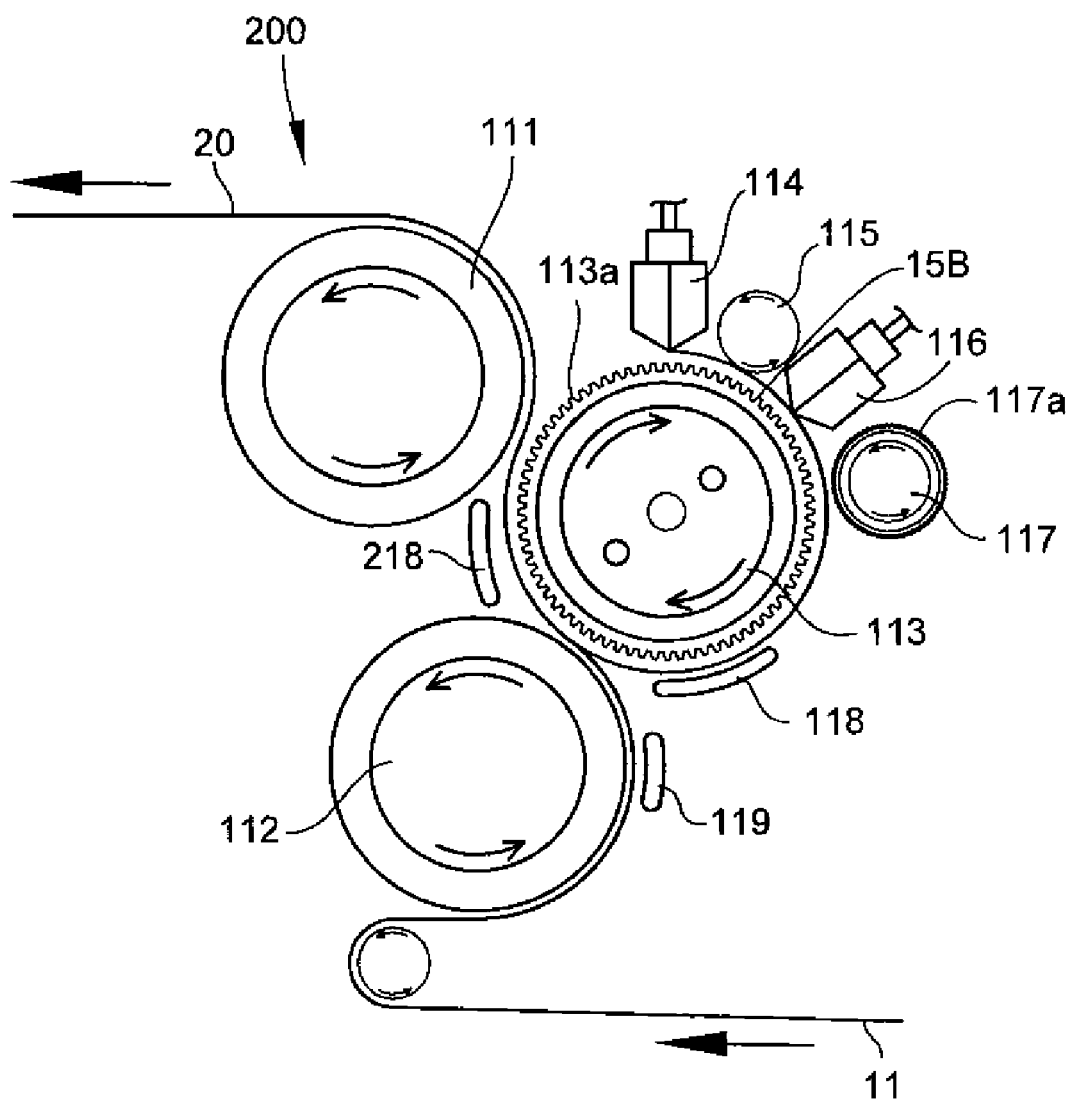
FIG. 2 shows a system for making a spiked noise absorber carpet comprised of a fabric layer and two perforated resinous backing layers according to another embodiment of the present invention.

FIG. 2 shows another system 200, a modification of the system 100 shown in FIG. 1, to make a spiked noise absorber carpet 10 comprised of a fabric layer 11 and two resinous backing layers 15A and 15B according to another preferred embodiment of the present invention, additionally including an upper resin feeder 116 which feeds an upper resinous backing material 15B onto a continuous lower or base resinous backing material 15A provided from a base resin feeder 114 onto a backing roll 113 which has been provided with spikes 15a. This type of multi-layered noise absorber carpet 10 will generally provide improved noise absorption or damping.

The backing materials 15A and 15B are heat bonded together and perforated together as they are pressed between the perforation roll 117 and the backing roll 113. The dual backing layers 15A and 15B are heated with a backing heater 118 and heat bonded with a fabric sheet material 11 as pressed between a fabric feeder roll 112 and the backing roll 113 to form a continuous noise absorber carpet 10. A cooling medium 218 cools the backing layers 15a and 15b in a range between 10 and 50° C. to instantaneously cure the perforations and spikes.

The backing material 15A may be identical with the backing material 15B or may be different from the backing material 15B.

The press roll 115 may be provided downstream of the upper resin feeder 116 in another embodiment of the present invention (not shown).

Figure 3:
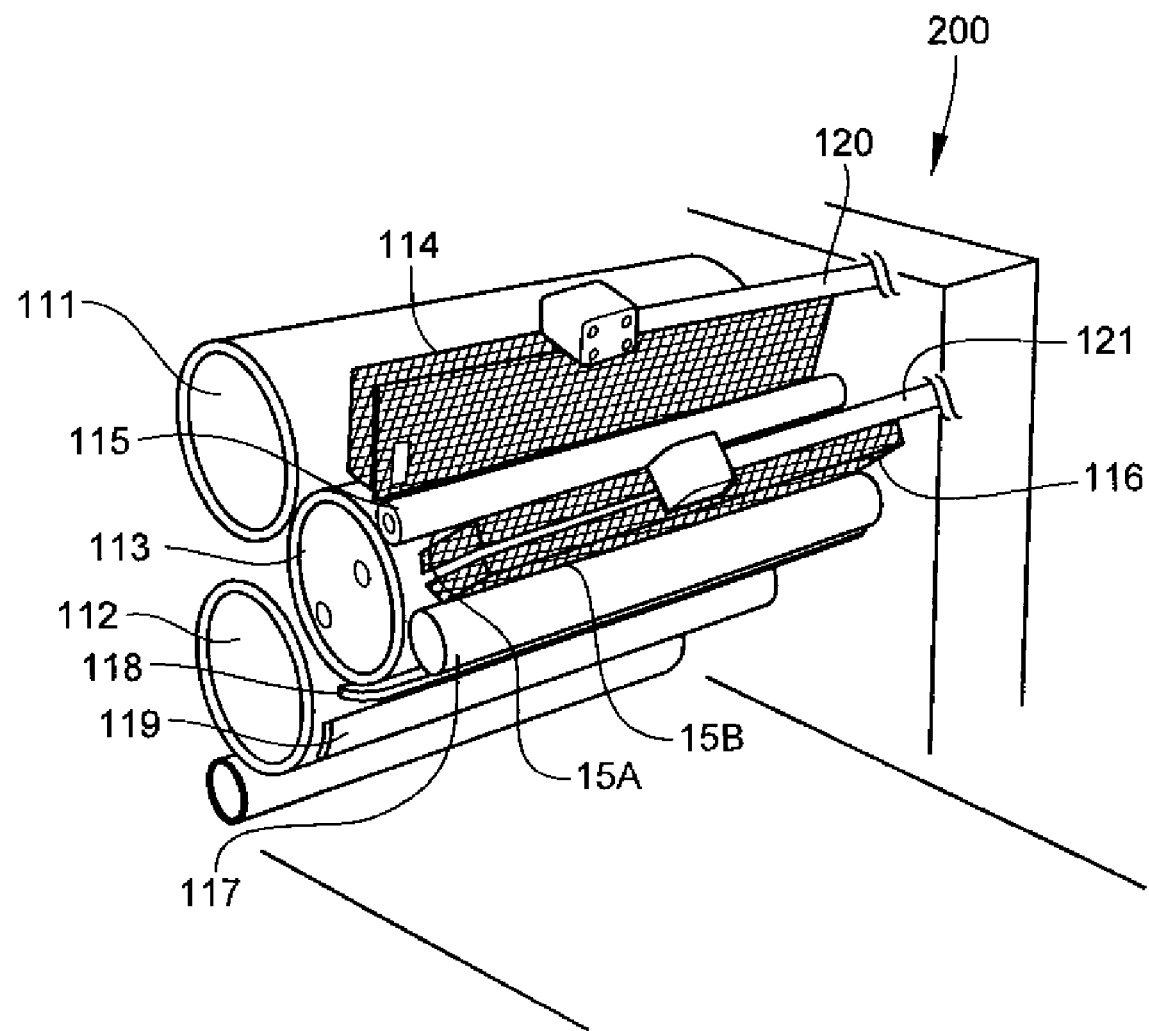
FIG. 3 is a perspective view of the system of FIG. 2.

FIG. 3 shows in a perspective view the system 200, where pipes 120 and 121 respectively feed the base and upper resin feeders 114 and 116 with a base backing material 15A and an upper backing material 15B.

Figure 4:
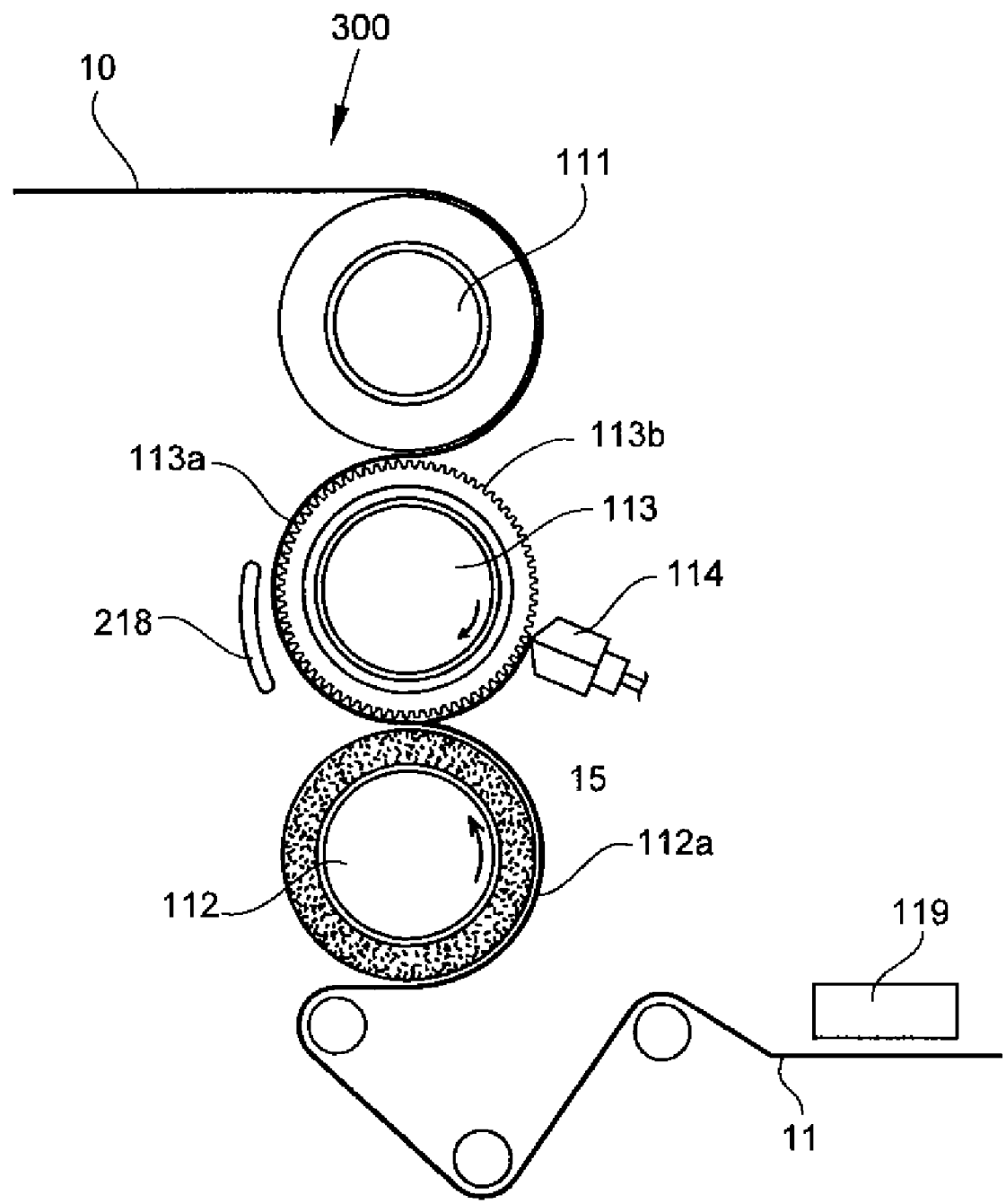
FIG. 4 shows a system for making a spiked noise absorber carpet comprised of a fabric layer and a perforated resinous backing layer according to another embodiment of the present invention.

FIG. 4 shows another system 300, a modification of the system 100, comprised of a fabric feeder roll 112 provided with a resilient cover 112a, a backing roll 113 provided with spike depressions 113a and perforation pins 113b accompanied by a backing resin feeder 114, and a carpet draw roll 111.

A continuous fabric sheet 11 heated with a fabric heater 119 is sent onto the resilient (rubber) fabric roll 112, which is heat bonded with a backing resin sheet material 15 provided from the backing resin feeder 114 between the fabric roll 112 and the backing roll 113. The backing sheet 15 is concurrently provided with perforations 16 and spikes 15a. A cooling medium 218 cools the backing layers 15a and 15b in a range between 10 and 50° C. to instantaneously cure the perforations and spikes. The resilient cover 112a effectively receives the spike pins 113b without physical damage.

Figure 5:
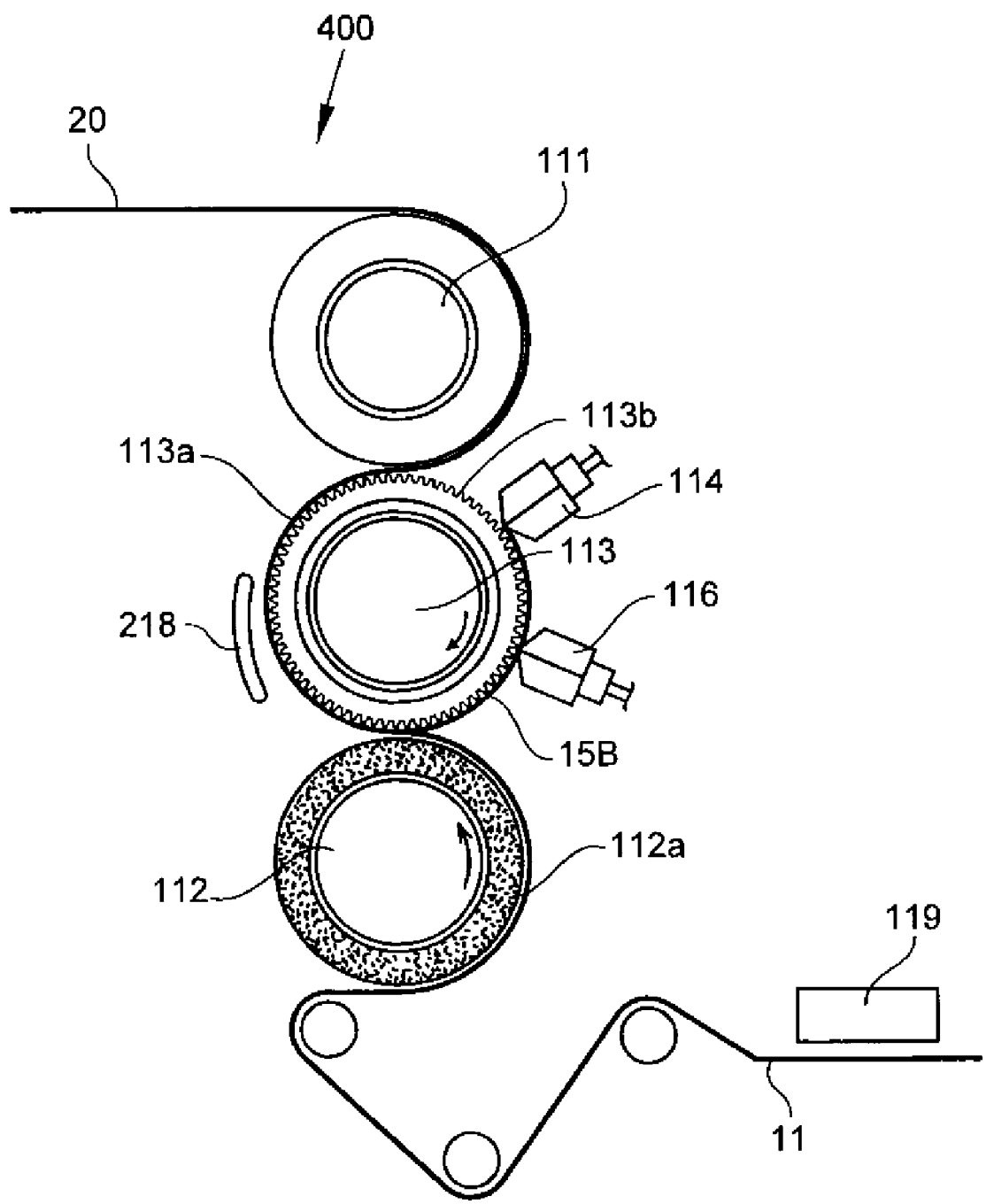
FIG. 5 shows a system for making a spiked noise absorber carpet comprised of a fabric layer and two perforated resinous backing layers according to another embodiment of the present invention.

FIG. 5 shows another system 400, a modification of the system 300, comprised of a fabric feeder roll 112 provided with a resilient cover 112a, a backing roll 113 provided with spike depressions 113a and perforation pins 113b accompanied by a base backing resin feeder 114 and an upper backing resin feeder 116, and a carpet draw roll 111. This system provides a spiked noise absorber carpet having two backing layers.

Figure 6A:
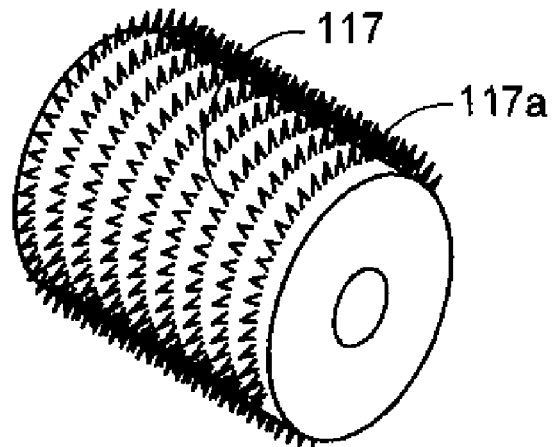
FIGS. 6a, 6b and 6c show a perforation roll, a circular conical perforation pin and a star-shaped perforation pin, respectively.
Figure 6B:
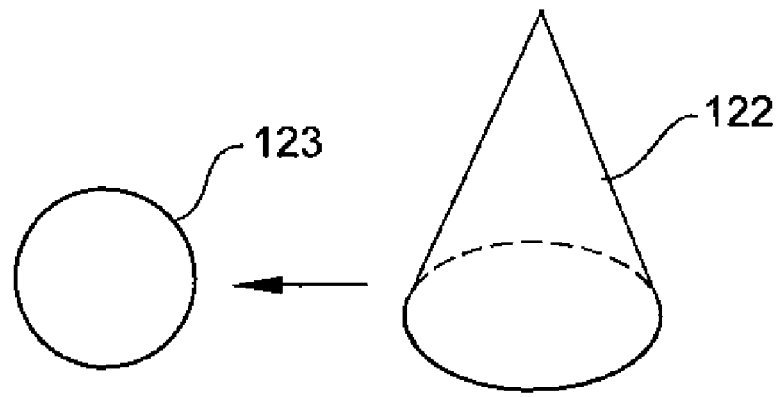
Figure 6C:
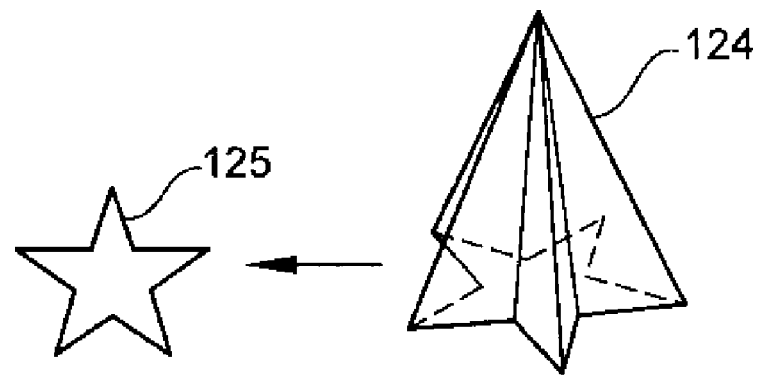

FIG. 6a shows a perforation roll 117 according to an embodiment of the present invention having numerous perforation pins 117a. The shape of perforations 16 may be any appropriate shape. In an embodiment of the present invention, the perforation pin 117a is a circular cone 122 to provide circular perforations 123 as shown in FIG. 6b. In another embodiment of the present invention, the perforation pin 117a is a star-shaped cone 124 to provide star-shaped perforations 125 as shown in FIG. 7c. The size of the perforation pin 117a and thus the size of the perforation 16 may be selected for a particular noise absorber carpet. In a preferred embodiment, the diameter of the perforation 16 is 1.5 mm.

Figure 7:
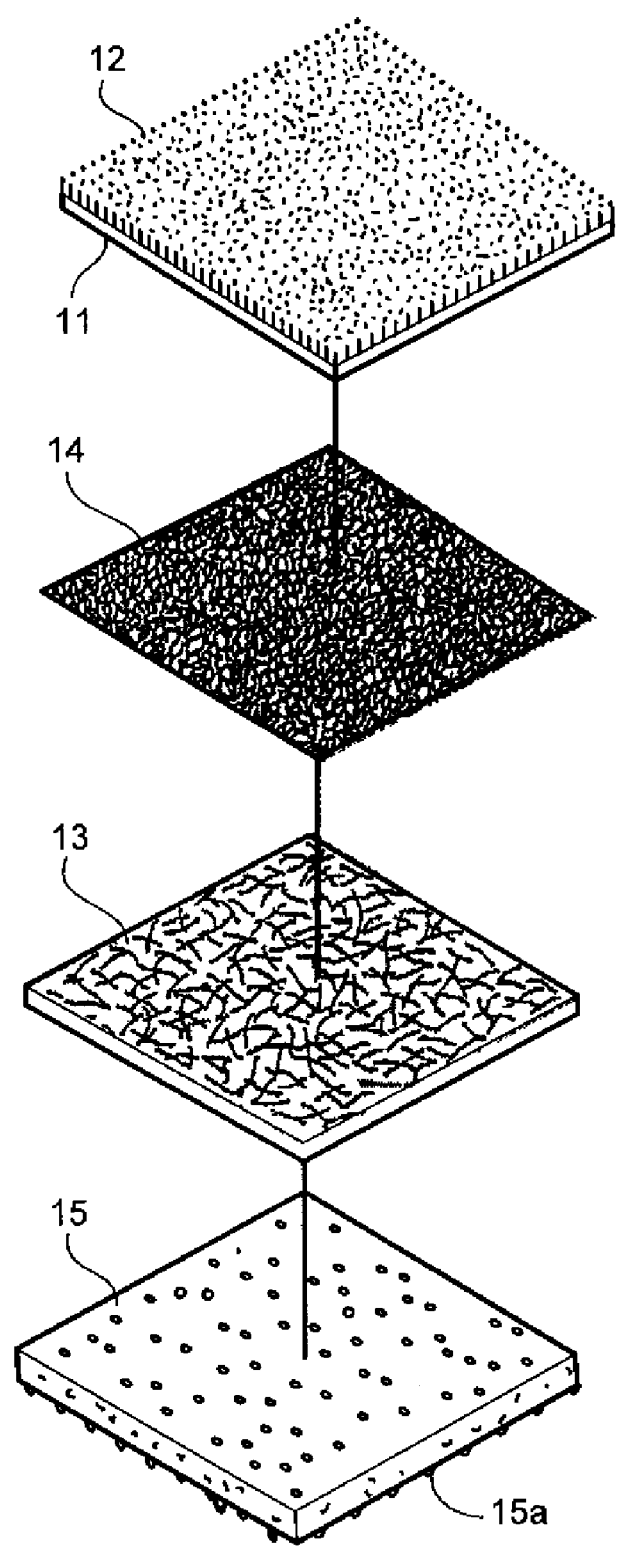
FIG. 7 is a perspective view showing each component layer of a spiked noise absorber carpet comprised of two fabric layers and a resinous backing layer according to an embodiment of the present invention.

FIG. 7 shows the structure of a noise absorber carpet 10 consisting of a fabric layer 11 on which pile 12 is provided, perforated adhesive layer 14, internal fabric layer 13 and spiked resinous backing layer 15 having spikes 15a. The piled fabric layer 11 and the internal fabric layer 13 are bonded with the perforated adhesive layer 14. The internal fabric layer 13 is heat bonded with the resinous backing layer 15.

The perforated adhesive layer 14 may be prepared by forming a web-like adhesive net and heat pressing the adhesive net between the two fabric layers 11 and 13. The perforated adhesive layer 14 partially let noises coming through the piled top fabric layer 14 pass through (to be absorbed by the internal fabric layer 13 and the resinous backing layer 15), and partially consumes noise energy by vibrating between the two fabric layers 14 and 13.

The top fabric layer 11 and the internal fabric layer 13 may be of an identical fabric material or may be of different fabric materials. In an embodiment of the present invention, the top fabric layer 11 is a nonwoven polyester fabric sheet of 300 g/m$^2$ and the internal fabric layer 13 is a nonwoven polyester fabric sheet of 300 g/m$^2$. In another embodiment of the present invention, the top fabric layer 11 is a nonwoven polyester fabric sheet of 200 g/m² and the internal fabric layer 13 is a nonwoven polyester fabric sheet of 350 g/m². In another embodiment of the present invention, the fiber used in the top fabric layer 11 and the fiber used in the internal fabric layer 13 are different in fiber size.

Figure 8:
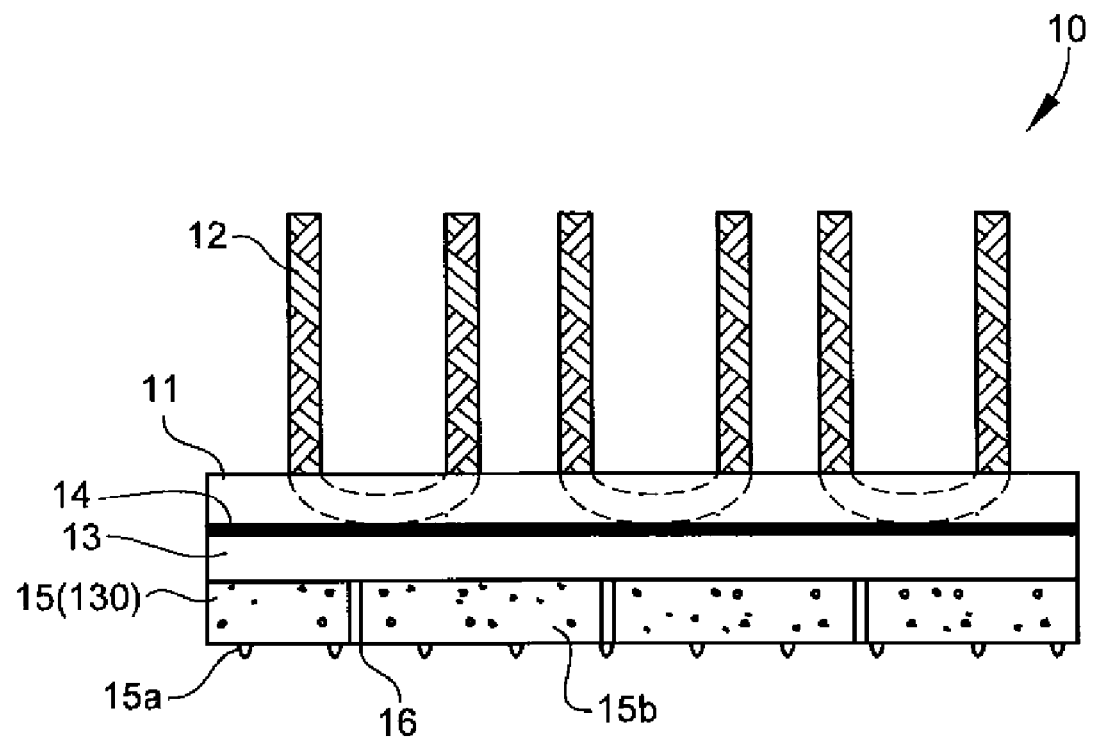
FIG. 8 is a side sectional view partially showing a piled noise absorber carpet comprised of two fabric layers and a resinous backing layer according to an embodiment of the present invention.

FIG. 8 shows the noise absorber carpet 10 in a sectional view. The perforated adhesive layer 14 securely holds the pile 12. The resinous backing layer 15 is provided with spikes 15a and continuous open cells 15b as well, as perforations 16. The backing roll 113 may be cooled in a range between 10 to 50° C. to assist formation of the perforations 16.

Figure 9:
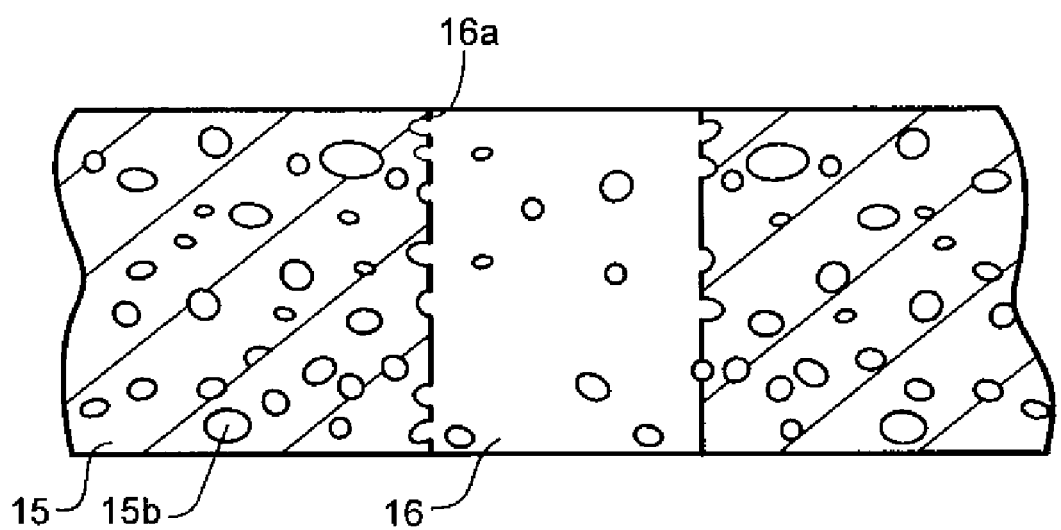
FIG. 9 is a partial sectional view showing an enlarged perforation provided in a resinous backing material.

FIG. 9 shows an enlarged view of the continuous open cells 15b and a perforation 16. The perforation 16 includes numerous pores 16a (broken cells 15b) on its wall, which are naturally provided when the perforation 16 is prepared. These pores 16a provide efficient absorption of noises which enter the perforation 16 from above.

Figure 10:
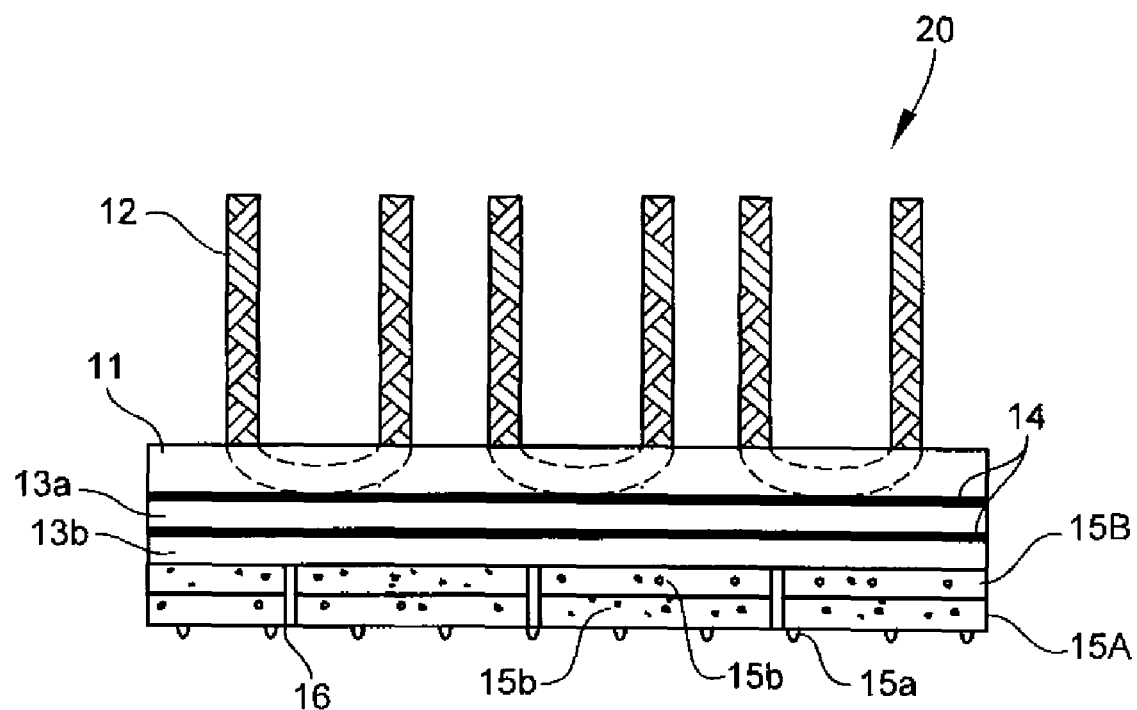
FIG. 10 is a side sectional view partially showing a piled noise absorber carpet comprised of three fabric layers and two resinous backing layers according to another embodiment of the present invention.

FIG. 10 shows another noise absorber carpet 20 including a top fabric layer 11 with pile 12, perforated adhesive layer 14, upper internal fabric layer 13a, lower internal fabric layer 13b, upper resinous backing layer 15B and base (lower) resinous backing layer 15A. The upper internal fabric layer 13a and the lower internal fabric layer 13b are bonded together with another adhesive layer 14. The upper backing layer 15B and the base backing layer 15A are heat bonded.

The fabric layers 11, 13a and 13b may be of an identical fabric material or different fabric materials. The backing layers 15A and 15B may be of an identical resin material or different resin materials. This type of noise absorber carpet will provide an improved noise damping property.

Figure 11A:
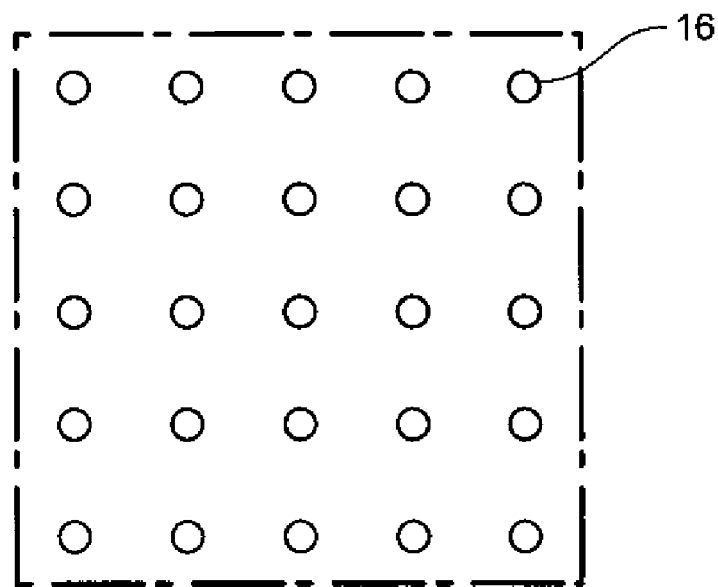
FIG. 11a is an enlarged plan view showing a perforation arrangement.
Figure 11B:
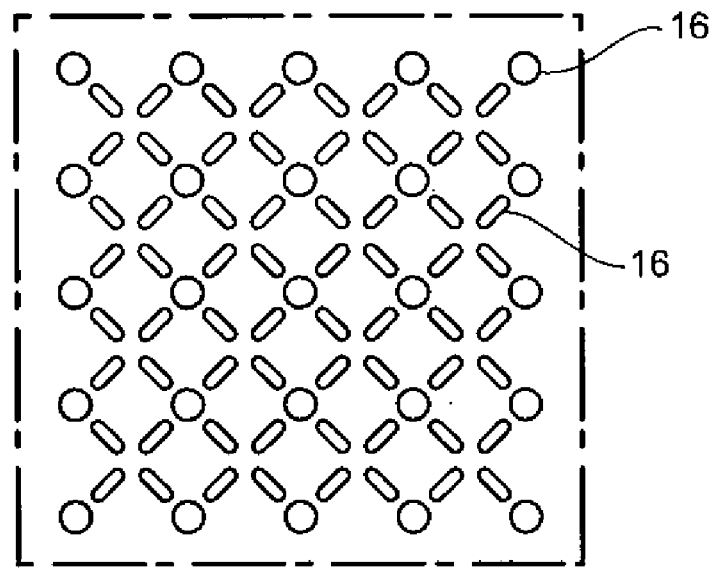
FIG. 11b is an enlarged plan view showing a perforation arrangement according to another embodiment of the present invention.

FIG. 11a and FIG. 11b show embodiments of perforation arrangements. In FIG. 11a, an arrangement of circular perforations 16 is shown. In FIG. 11b, a combined arrangement of circular perforations 16 and oval perforations 16 is shown. Other perforation arrangements are also possible.

The embodiments provided herein are for the purpose of describing the present invention. They are not in any way intended to restrict the scope of the present invention.

I claim:

1. A process for making a noise absorber carpet comprised of a fabric layer portion and a resinous backing layer portion, comprising the substantially concurrent steps of:
   providing a backing roll and cooling the backing roll to a temperature from about 10 to about 50 degrees Celcius;
   extruding hot backing resin from a die in the form of a continuous sheet onto the cooled backing roll to form a resinous backing layer;
   providing a perforation roll including a plurality of perforating pins and positioning the perforation roll in proximity to the backing roll;
   perforating the resinous backing layer by passing the resinous backing layer between the perforation roll and the backing roll while pressing the perforating pins against the resinous backing layer on the backing roll;
   providing a fabric feeder roll for feeding a continuous fabric sheet onto the backing roll;
   heating the continuous fabric sheet;
   heating the perforated backing layer; and
   press bonding the heated fabric sheet and the heated perforated backing layer together to form a continuous noise absorber carpet.

2. The process of claim 1, wherein the resinous backing layer portion comprises a plurality of backing layers.

3. The process of claim 1, further comprising forming slippage prevention spikes on the backing layer portion by pressing the backing layer portion against a backing roll having slippage prevention depressions.

4. A system for making a noise absorber carpet comprised of a fabric layer portion and a resinous backing layer portion, the system comprising a fabric feeder roll for feeding a continuous roll of fabric to a carpet take up roll, a backing roll downstream of the feeder roll for receiving a continuous sheet of soft resinous backing material and rotating the resinous backing material to the roll of fabric, at least one resin feeder for feeding the sheet of resinous backing material onto the backing roll, a perforation roll having perforation pins for perforating the resinous backing material on the backing roll, and a heater for heating each of the fabric and the resinous backing material prior to press bonding the two together, wherein the backing roll is cooled at a temperature range of about 10 to 50 degrees Celsius.

5. The system of claim 4, wherein the at least one resin feeder comprises two resin feeders.

6. The system of claim 4, wherein the backing roll is provided with spike depressions thereon.

7. The system of claim 4, wherein the at least one resin feeder feeds a resinous backing material containing continuous open cells.

8. A system for making a noise absorber carpet comprised of a fabric layer portion and a resinous backing layer portion, comprising:
   (a) a fabric feeder roll for feeding a continuous roll of fabric to a carpet take up roll;
   (b) a backing roll having perforation pins, the backing roll arranged between the fabric feeder roll and the carpet take up roll for press bonding a perforated resinous backing material to the fabric;
   (c) a least one resin feeder which feeds the resinous backing material in a sheet form onto the backing roll;
   (d) cooling means to cool the backing roll at a temperature range of about 10 to 50 degrees Celsius; and
   (e) heaters for heating each of the fabric and the resinous backing material prior to press bonding the two together.

9. The system of claim 8, wherein the at least one resin feeder comprises two resin feeders.

10. The system of claim 8, wherein the backing roll is provided with spike depressions thereon.

11. The system of claim 8, wherein the at least one resin feeder feeds a resinous backing material containing continuous open cells.

* * * * *

UNITED STATES PATENT AND TRADEMARK OFFICE
CERTIFICATE OF CORRECTION

PATENT NO.         : 7,883,596 B2                            Page 1 of 1
APPLICATION NO.    : 12/109570
DATED              : February 8, 2011
INVENTOR(S)        : Kohei Yamada It is certified that error appears in the above-identified patent and that said Letters Patent is hereby corrected as shown below:

Title page amend the assignees to be as follows:

(73)    Assignees:    Kabushiki Kaisha Daiwa, Gifu-ken (JP);
                      Kabushiki Kaisha Yachiyo, Gifu-ken (JP);
                      Kabushiki Kaisha Shoei, Gifu-ken (JP)

Signed and Sealed this
Twenty-first Day of February, 2012

David J. Kappos
*Director of the United States Patent and Trademark Office*